(12) United States Patent
Kim

(10) Patent No.: US 7,876,402 B2
(45) Date of Patent: Jan. 25, 2011

(54) LIQUID CRYSTAL DISPLAY DEVICE

(75) Inventor: Jae-Hyun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 195 days.

(21) Appl. No.: 11/972,999

(22) Filed: Jan. 11, 2008

(65) Prior Publication Data

US 2008/0218656 A1  Sep. 11, 2008

(30) Foreign Application Priority Data

Mar. 8, 2007  (KR) ...................... 10-2007-0022970

(51) Int. Cl.
  G02B 5/30   (2006.01)
  G02B 27/28  (2006.01)
  G02F 1/1335 (2006.01)
  G02F 1/1337 (2006.01)

(52) U.S. Cl. .................. 349/96; 359/486; 349/123

(58) Field of Classification Search ............ 349/96; 359/486

See application file for complete search history.

(56) References Cited

U.S. PATENT DOCUMENTS

| | | | |
|---|---|---|---|
| 4,213,810 A | 7/1980 | Heynisch et al. | |
| 4,256,787 A * | 3/1981 | Shaver et al. | 428/1.5 |
| 5,818,615 A * | 10/1998 | Abileah et al. | 349/117 |
| 5,986,730 A * | 11/1999 | Hansen et al. | 349/96 |
| 6,650,385 B1 * | 11/2003 | Liu | 349/113 |
| 6,798,476 B2 * | 9/2004 | Hanakawa et al. | 349/113 |
| 6,977,702 B2 | 12/2005 | Wu | |
| 6,987,547 B2 | 1/2006 | Yang et al. | |
| 2003/0071952 A1 * | 4/2003 | Yoshida et al. | 349/141 |
| 2004/0227875 A1 * | 11/2004 | Park et al. | 349/113 |
| 2005/0088586 A1 * | 4/2005 | Mori et al. | 349/62 |

FOREIGN PATENT DOCUMENTS

| | | |
|---|---|---|
| JP | 2003167246 | 6/2003 |
| JP | 2003279961 | 10/2003 |

(Continued)

OTHER PUBLICATIONS

T. Sergan et al., "P-81: Twisted Nematic Reflective Display with Internal Wire Grid Polarizer". SID '02 Digest, pp. 514-517 Published May 2002.*

Primary Examiner—David Nelms
Assistant Examiner—Michael Inadomi
(74) Attorney, Agent, or Firm—Cantor Colburn LLP

(57) ABSTRACT

A liquid crystal display device includes an upper panel comprising an alignment layer attached on an inner surface of the upper panel and a polarizer attached on an outer surface of the upper panel, a lower panel including a first surface and an opposite second surface, the first surface facing the inner surface of the upper panel, a phase retardation layer and a plurality of metallic lines disposed on the first surface of the lower panel, the plurality of metallic lines disposed substantially parallel to each other and which extend in a first direction, liquid crystal molecules injected between the upper and lower panels and a backlight unit comprising a light source which emits light toward the lower panel and a reflector which reflects light from the lower panel, wherein the phase retardation layer is disposed between the plurality of metallic lines and the second surface of the lower panel.

7 Claims, 9 Drawing Sheets

FOREIGN PATENT DOCUMENTS

| | | |
|---|---|---|
| JP | 2004170795 | 6/2004 |
| JP | 2006047829 | 2/2006 |
| KR | 1020040047328 | 6/2004 |
| KR | 1020040069341 | 8/2004 |
| KR | 1020060042481 | 5/2006 |
| KR | 1020060088741 | 8/2006 |

* cited by examiner

US 7,876,402 B2

LIQUID CRYSTAL DISPLAY DEVICE

This application claims priority to Korean Patent Application No. 10-2007-0022970, filed on Mar. 8, 2007, and all the benefits accruing therefrom under 35 U.S.C. §119, the contents of which in its entirety are herein incorporated by reference.

BACKGROUND OF THE INVENTION (a) Field of the Invention

The present invention relates to a thin film transistor ("TFT") array panel and a liquid crystal display ("LCD") device, and more particularly, to a TFT array panel and a LCD device capable of improving luminance by enhancing an efficiency of light used from, for example, a backlight unit.

(b) Description of the Related Art

The LCD is one of the most widely used flat panel displays, and includes two display panels on which field generating electrodes, such as pixel electrodes and a common electrode, are formed, and a liquid crystal layer interposed between the two display panels.

A voltage is applied to the field generating electrodes formed on the two display panels to generate an electric field at the liquid crystal layer to thereby control an alignment of liquid crystal molecules within the liquid crystal layer and control polarization of an incident light to display desired images.

In terms of a light source, LCD types can be divided into a backlit LCD that displays images by using a backlight positioned at a rear surface of a liquid crystal cell, and a reflective LCD that displays images by using external light. In addition, the LCD types also includes a transflective LCD that combines structures of the backlit LCD and the reflective LCD. The transflective LCD is operated in a backlit mode (transmission mode) in which images are displayed by using an internal light source of the LCD in a room or in a dark area where there is no external light, and is also operated in a reflective mode in which images are displayed by reflecting an external light in an environment with a high intensity of illumination.

Of the LCD types, the backlit LCD and the transflective LCD, both of which display images by using the backlight, are commonly used because of their advantage of having a high display luminance.

However, the backlit LCD and the transflective LCD have problems in that approximately 50% of incident light from the backlight is absorbed by a polarizer attached on a lower portion of the LCD and only the remaining 50% or so of the light is used to display an image, thereby degrading the light efficiency and the display luminance.

BRIEF SUMMARY OF THE INVENTION

An exemplary embodiment of the present invention provides a liquid crystal display ("LCD") including an upper panel including an alignment layer, the alignment layer attached on an inner surface of the upper panel and a polarizer attached on an outer surface of the upper panel, a lower panel including a first surface and an opposite second surface, the first surface facing the inner surface of the upper panel, and the lower panel including a plurality of metallic lines disposed on the first surface of the lower panel, the plurality of metallic lines disposed substantially parallel to each other and which extend in a first direction and a phase retardation layer, liquid crystal molecules injected between the upper and lower panels and a backlight unit including a light source which emits light toward the lower panel and a reflector which reflects light reflected from the lower panel, wherein the phase retardation layer is disposed between the plurality of metallic lines and the second surface of the lower panel.

In an exemplary embodiment, intervals between the plurality of metallic lines may be narrower than a wavelength of visible rays.

In an exemplary embodiment, the plurality of metallic lines may reflect light of a polarization component in the first direction and allow light of a polarization component in a second direction to transmit therethrough, the second direction substantially perpendicular to the first direction.

In an exemplary embodiment, the plurality of metallic lines may contact the liquid crystal molecules to align the liquid crystal molecules in the first direction.

In an exemplary embodiment, the polarizer may allow the light of the polarization component in the first direction to transmit therethrough.

In exemplary embodiments, the phase retardation layer may include a slower axis and a faster axis, and may change circular polarization to linear polarization or linear polarization to circular polarization by creating a phase difference between light in the slower axis direction and light in the faster axis direction of $\lambda/4$.

In exemplary embodiments, the slower axis or the faster axis of the phase retardation layer may make an angle of about 45° with respect to the first or second direction.

Another exemplary embodiment of the present invention provides an LCD including an upper panel including an alignment layer, the alignment layer attached on an inner surface of the upper panel and a polarizer attached on an outer surface of the upper panel, a lower panel including a first surface and an opposite second surface, the first surface facing the inner surface of the upper panel, and the lower panel including a plurality of metallic lines disposed on the first surface of the lower panel, the plurality of metallic lines disposed substantially parallel to each other and which extend in a first direction, liquid crystal molecules injected between the upper and lower panels and a backlight unit including a light source which emits light toward the lower panel and a reflector which reflects light made incident from the lower panel, wherein the lower panel includes a thin film transistor ("TFT"), a pixel electrode, a phase retardation layer and an insulation substrate, and the phase retardation layer is disposed on the insulation substrate, the TFT is disposed on the phase retardation layer, the pixel electrode is disposed on the TFT and the plurality of metallic lines are disposed on the pixel electrode.

Yet another exemplary embodiment of the present invention provides an LCD including an upper panel including an alignment layer, the alignment layer attached on an inner surface of the upper panel and a polarizer attached on an outer surface of the upper panel, a lower panel including a first surface and an opposite second surface, the first surface facing the inner surface of the upper panel, and the lower panel including a plurality of metallic lines disposed on the first surface of the lower panel, the plurality of metallic lines disposed substantially parallel to each other and which extend in a first direction, liquid crystal molecules injected between the upper and lower panels and a backlight unit including a light source which emits light toward the lower panel and a reflector which reflects light made incident from the lower panel, wherein the lower panel includes a TFT, a pixel electrode, a phase retardation layer and an insulation substrate, and the TFT is disposed on the insulation substrate, the pixel electrode is disposed on the TFT, the phase retardation layer is disposed on the pixel electrode, the plurality of metallic lines are disposed on the phase retardation layer, and the phase retardation layer and the plurality of metallic lines extend with a same size and at a same interval as each other in the first direction.

Still another exemplary embodiment of the present invention provides an LCD including an upper panel including an alignment layer, the alignment layer attached on an inner surface of the upper panel and a polarizer attached on an outer surface of the upper panel, a lower panel including a first surface and an opposite second surface, the first surface facing the inner surface of the upper panel, and the lower panel including a plurality of metallic lines disposed on the first surface of the lower panel, the plurality of metallic lines disposed substantially parallel to each other and which extend in a first direction, liquid crystal molecules injected between the upper and lower panels and a backlight unit including a light source which emits light toward the lower panel and a reflector which reflects light made incident from the lower panel, wherein the lower panel includes a TFT, a pixel electrode, a phase retardation layer and an insulation substrate, the phase retardation layer is disposed on the insulation substrate, the TFT is disposed on the phase retardation layer, the pixel electrode is disposed on the TFT and the plurality of metallic lines are disposed on the pixel electrode, and the phase retardation layer and the plurality of metallic lines extend with a same size and at a same interval as each other in the first direction.

Another exemplary embodiment of the present invention provides an LCD including an upper panel including an alignment layer, the alignment layer attached on an inner surface of the upper panel and a polarizer attached on an outer surface of the upper panel, a lower panel including a first surface and an opposite second surface, the first surface facing the upper panel and including a plurality of metallic lines disposed on the first surface of the lower panel, the plurality of metallic lines disposed substantially parallel to each other and which extend in a first direction, liquid crystal molecules injected between the upper and lower panels and a backlight unit including a light source which emits light toward the lower panel and a reflector which reflects light made incident from the lower panel, wherein the lower panel includes a TFT, a pixel electrode, a phase retardation layer and an insulation substrate, the TFT is disposed on the insulation substrate, the phase retardation layer is disposed on the TFT, the pixel electrode is disposed on the phase retardation layer and the plurality of metallic lines are disposed on the pixel electrode, and the pixel electrode is connected with the TFT via an opening of the phase retardation layer.

BRIEF DESCRIPTION OF THE DRAWINGS

The accompanying drawings briefly described below illustrate exemplary embodiments of the present invention, and, together with the description thereof, serve to describe the above and other aspects, features and advantages of the present invention, in which.

DETAILED DESCRIPTION OF THE INVENTION

Figure 1:
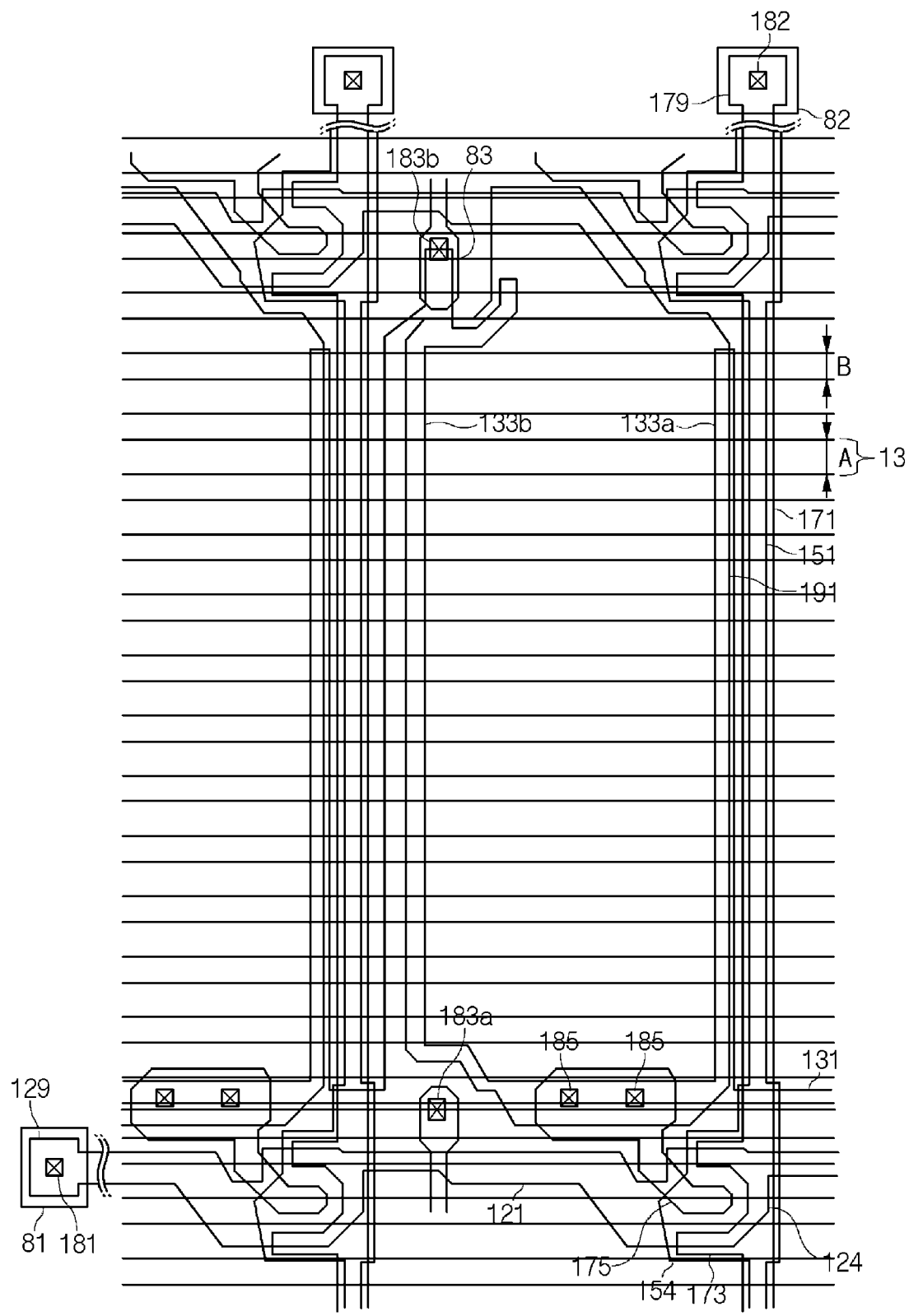
FIG. 1 is a top plan layout view of an exemplary embodiment of a thin film transistor ("TFT") array panel of an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

One aspect of the present invention is to provide a thin film transistor ("TFT") array panel and a liquid crystal display ("LCD") capable of improving luminance by significantly enhancing an efficiency of using light provided from a backlight unit. In addition, another aspect of the present invention is to align liquid crystal molecules without forming an alignment layer.

To accomplish the above aspects, features and advantages of the present invention, multiple metallic lines which extend in a first direction are arranged at intervals narrower than wavelengths of visible rays.

The present invention will be described more fully hereinafter with reference to the accompanying drawings, in which exemplary embodiments of the present invention are shown. As those of ordinary skill in the art would realize, the described exemplary embodiments may be modified in various different ways, all without departing from the spirit or scope of the present invention.

First, the LCD according to one exemplary embodiment of the present invention will now be described in further detail with reference to FIGS. 1 to 5.

Figure 2:
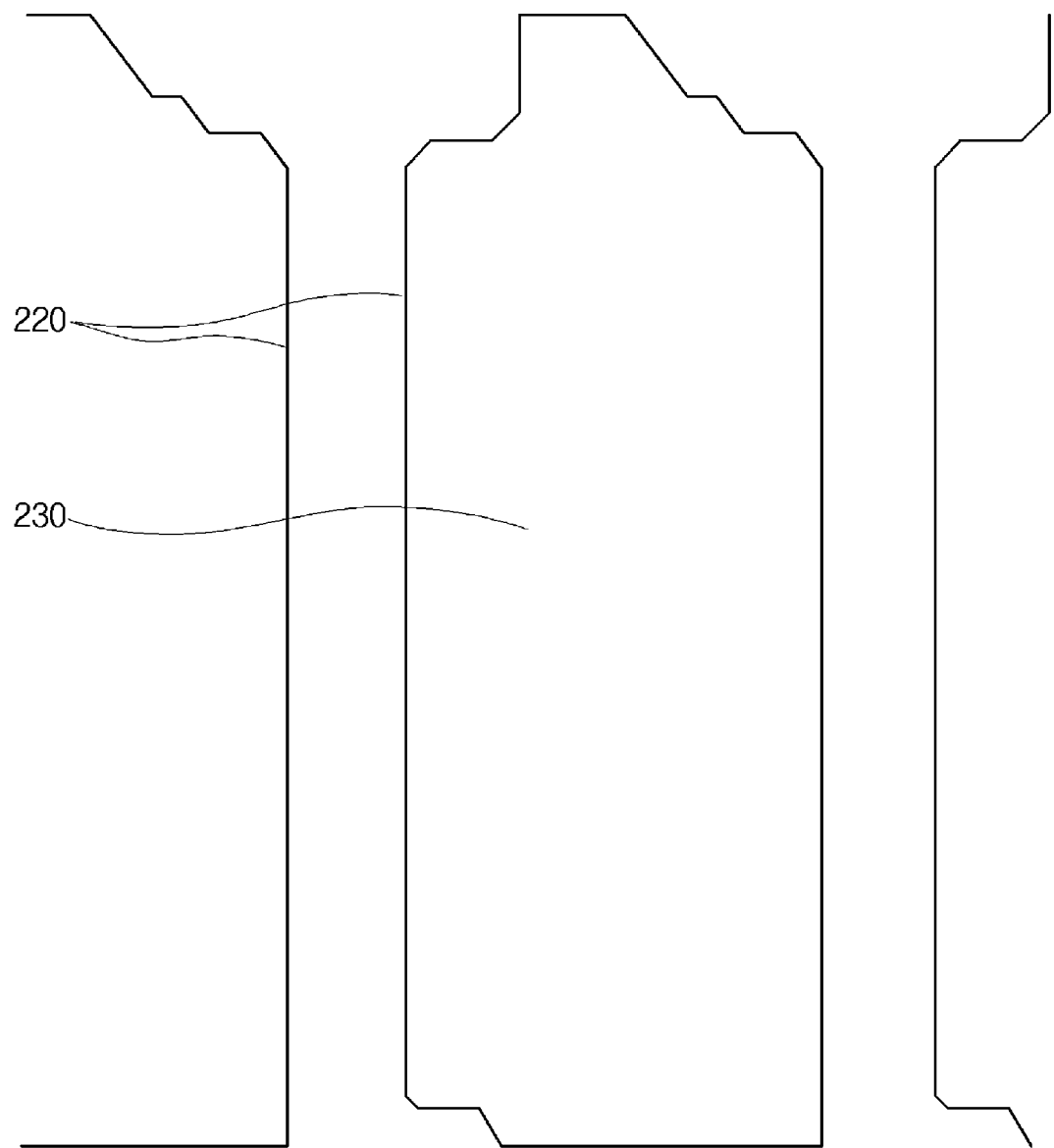
FIG. 2 is a top plan layout view of an exemplary embodiment of a common electrode panel of the exemplary embodiment of an LCD according to the present invention.
Figure 3:
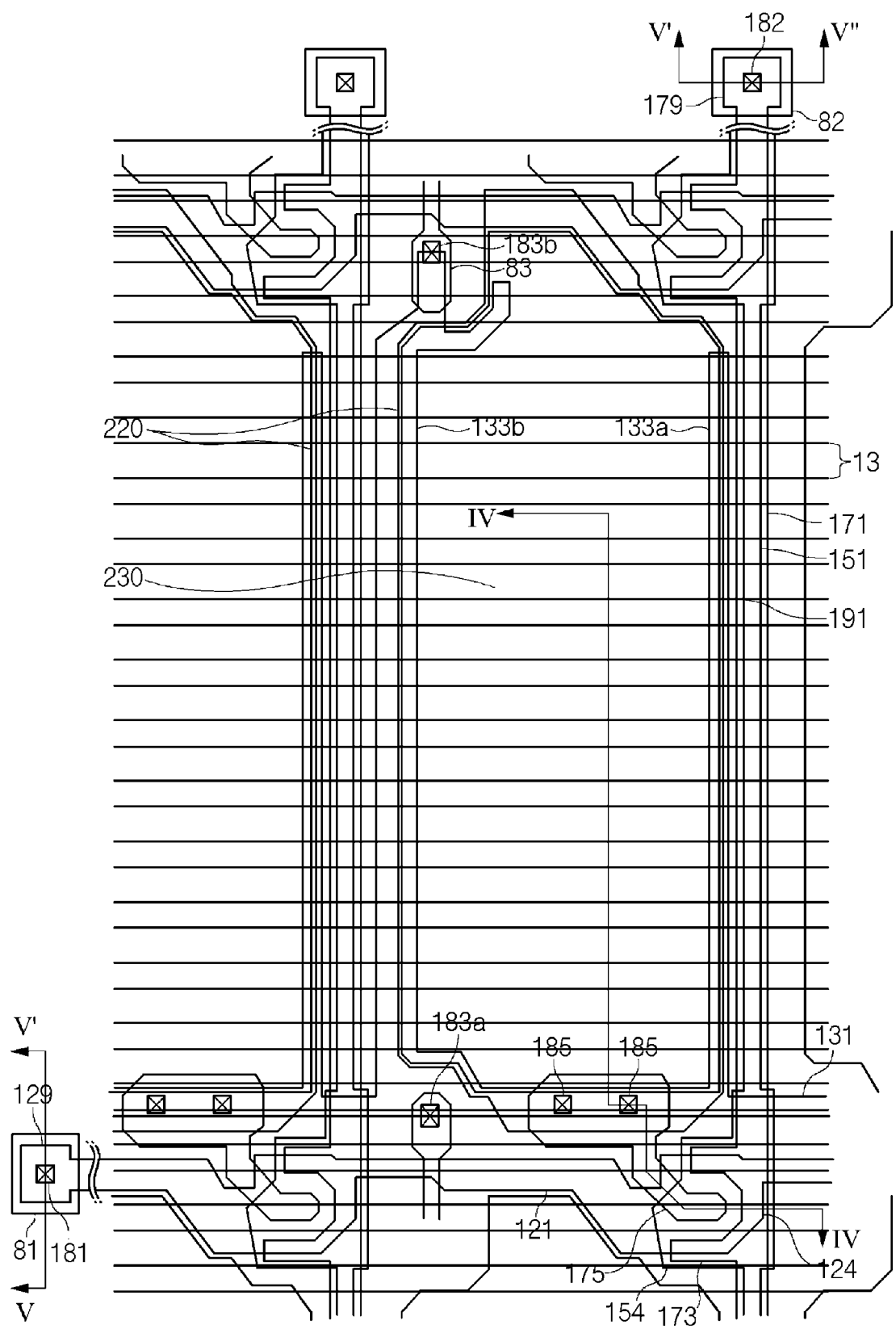
FIG. 3 is a top plan layout view of the exemplary embodiment of an LCD including the exemplary embodiment of a TFT array panel in FIG. 1 and the exemplary embodiment of a common electrode panel in FIG. 2.

FIG. 1 is a top plan layout view of an exemplary embodiment of a thin film transistor ("TFT") array panel of an exemplary embodiment of a liquid crystal display ("LCD") according to the present invention, FIG. 2 is a top plan layout view of an exemplary embodiment of a common electrode panel of the exemplary embodiment of an LCD according to the present invention and FIG. 3 is a top plan layout view of the exemplary embodiment of an LCD including the exemplary embodiment of a TFT array panel in FIG. 1 and the exemplary embodiment of a common electrode panel in FIG. 2.

Figure 4:
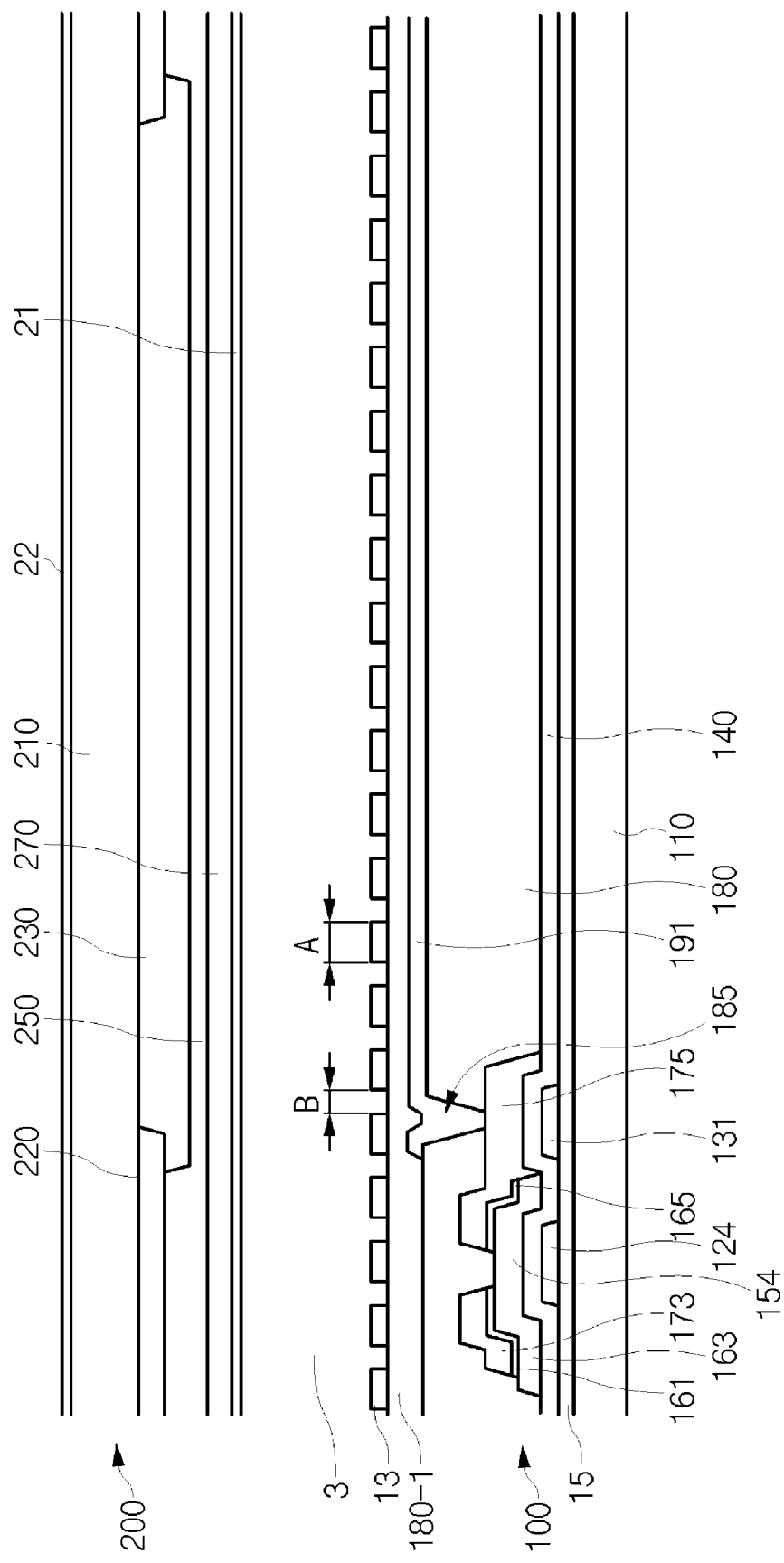
FIG. 4 is a cross-sectional schematic diagram view taken along line IV-IV of the exemplary embodiment of an LCD in FIG. 3.
Figure 5:
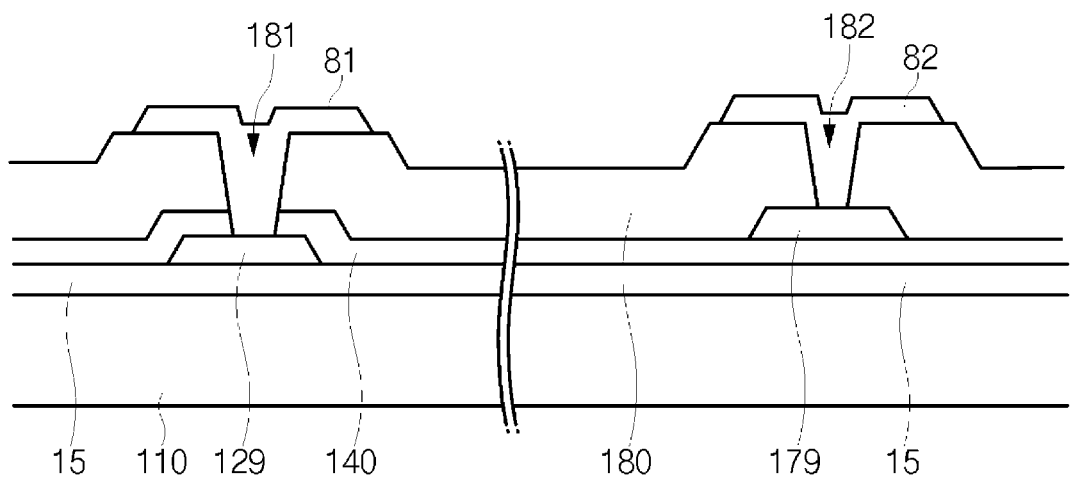
FIG. 5 is a cross-sectional schematic diagram view taken along line V-V' and V'-V" of the exemplary embodiment of an LCD in FIG. 3.

FIG. 4 is a cross-sectional schematic diagram view taken along line IV-IV of the exemplary embodiment of an LCD in FIG. 3, and FIG. 5 is a cross-sectional schematic diagram view taken along line V-V' and V'-V'' of the exemplary embodiment of an LCD in FIG. 3.

With reference to FIGS. 1 to 5, the LCD according to one exemplary embodiment of the present invention includes a TFT array panel 100 and a common electrode panel 200 which face each other, and a liquid crystal layer 3 interposed between the TFT array panel 100 and the common electrode panel 200.

First, the TFT array panel 100 will now be described with reference to FIGS. 1 to 5.

A phase retardation layer 15 is formed on an insulation substrate 110 made of transparent glass or plastic, in exemplary embodiments. The phase retardation layer 15 includes a slower axis and a faster axis, and serves to change circular polarization to linear polarization or linear polarization to circular polarization by creating a phase difference between light in a direction of the slower axis and light in a direction of the faster axis of $\lambda/4$, where $\lambda$ refers to a wavelength.

A plurality of gate lines 121 and a plurality of storage electrode lines 131 are formed on the phase retardation layer 15.

The gate lines 121 transfer gate signals and extend substantially in a first direction, such as a horizontal direction. Referring to FIG. 1, each gate line of the plurality of gate lines 121 includes a plurality of gate electrodes 124 protruded downward and a large end portion 129 for a connection with a different layer or an external driving circuit (not shown).

The storage electrode lines 131 receive specific voltages, and include branch lines substantially parallel to the gate lines 121 and pairs of first and second storage electrodes 133a and 133b, respectively, branched from the branch lines. In exemplary embodiments, the storage electrodes lines 131 may be modified to include various shapes and dispositions.

In an exemplary embodiment, a gate insulating layer 140 made of silicon nitride ("$SiN_x$") or silicon oxide ("$SiO_x$"), is formed on the gate lines 121 and the storage electrode lines 131.

In exemplary embodiments, a plurality of semiconductor stripes 151 made of hydrogenated amorphous silicon ("a-Si") or polycrystalline silicon are formed on the gate insulating layer 140. The semiconductor stripes 151 extend substantially in a second direction, such as a vertical direction, and are periodically bent. Each semiconductor stripe 151 includes a plurality of projections 154 which extend toward the gate electrode 124.

Referring to FIG. 4, a plurality of ohmic contact stripes and islands 161 and 165, respectively, are formed on the projections 154 of the semiconductor stripes 151. In exemplary embodiments, the ohmic contact stripes and islands 161 and 165, respectively, may be made of a material such as n+ hydrogenated amorphous silicon in which n-type impurities, such as phosphor, are doped with a high density, or of silicide. The ohmic contact stripes 161 include a plurality of projections 163, and the projections 163 and the ohmic contact islands 165 are disposed as pairs on the projections 154 of the semiconductor stripes 151.

A plurality of data lines 171 and a plurality of drain electrodes 175 are formed on the ohmic contact stripes and islands 161 and 165 and on the gate insulating layer 140.

The data lines 171 transfer data signals and extend substantially in the second direction, such as the vertical direction, to intersect the gate lines 121. Each data line 171 includes a plurality of source electrodes 173 which extend toward the gate electrodes 124 and a large end portion 179 for a connection with a different layer or an external driving circuit (not shown).

The drain electrode 175 is separated from the data line 171 and faces the source electrode 173, and the drain electrode 175 is disposed at a central portion of the gate electrode 124.

One gate electrode 124, one source electrode 173 and one drain electrode 175 form a thin film transistor ("TFT") together with the projection 154 of the semiconductor stripe 151, and a channel of the TFT is formed at the projection 154 between the source electrode 173 and the drain electrode 175.

A passivation layer 180 is formed on the data line 171, the drain electrode 175 and on an exposed portion of the semiconductor stripe 151. In exemplary embodiments, the passivation layer 180 is made of an inorganic insulator or an organic insulator, but is not limited thereto, and may include a planarized surface.

The passivation layer 180 includes a plurality of contact holes 182 and 185, which respectively expose the large end portion 179 of the data line 171 and a large end portion of the drain electrode 175, and the passivation layer 180 and the gate insulating layer 140 include a plurality of contact holes 181 which expose the large end portion 129 of the gate line 121.

At an upper portion of the passivation film 180, there are formed a plurality of pixel electrodes 191, a plurality of overpasses 83 and a plurality of contact assistants 81 and 82. In exemplary embodiments, the pixel electrodes 191, the overpasses 83 and the contact assistants 81 and 82 may be made of a transparent conductive material such as indium tin oxide ("ITO") or indium zinc oxide ("IZO,") or a reflective metal such as aluminum, silver, chromium and alloys thereof, but are not limited thereto.

The pixel electrode 191 is physically and electrically connected to the drain electrode 175 via the contact hole 185, and the pixel electrode 191 receives a data voltage from the drain electrode 175. The pixel electrode 191, which receives the data voltage, generates an electric field together with a common electrode 270 of the common electrode panel 200, which receives a common voltage, to thereby control a direction of liquid crystal molecules 310 within the liquid crystal layer 3 therebetween. Polarization of light which transmits through the liquid crystal layer 3 differs depending on the direction of the controlled liquid crystal molecules 310. The pixel electrode 191 and the common electrode 270 form a capacitor (referred to hereinafter as a "liquid crystal capacitor") which is used to maintain an applied voltage even after the TFT is turned off.

The pixel electrode 191 and the end portion of the drain electrode 175 connected with the pixel electrode 191 overlap with the storage electrode line 131, which includes the storage electrodes 133a and 133b. A capacitor, formed as the pixel electrode 191 and the drain electrode 175 electrically connected with the pixel electrode 191 overlap with the storage electrode 131 is called a storage capacitor, which strengthens a voltage maintaining capability of the liquid crystal capacitor.

The contact assistants 81 and 82 are connected with the end portion 129 of the gate line 121 and the end portion 179 of the data line 171 via the contact holes 181 and 182, respectively.

The overpass 83 traverses the gate line 121 and is connected with an exposed portion of the storage electrode line 131 and an exposed end portion of a free end of the storage electrode 133b via the contact holes 183a and 183b, respectively. The contact holes 183a and 183b are positioned at opposite sides of the gate line 121.

A second passivation layer 180-1 is formed on an upper portion of the pixel electrode 191, the contact assistants 81 and 82 and the overpass 83 to thereby cover at least portions of the pixel electrode 191, the contact assistants 81 and 82 and the over pass 83. Similar to the passivation layer 180, the second passivation layer 180-1 is made of an inorganic insulator or an organic insulation and includes a planarized surface, in exemplary embodiments.

A plurality of metallic lines 13 is formed along a first direction, such as a horizontal direction, on an upper portion of the second passivation layer 180-1. The plurality of metallic lines 13 serve to reflect light with a first directional component, and allow light with a second directional component, which is substantially perpendicular to the first directional component, to transmit therethrough. In addition, the plurality of metallic lines 13 also serves as an alignment layer which arranges liquid crystal molecules 310 along the first direction.

The metallic lines 13 include a width "A" and are spaced apart from each other by an interval "B". The interval "B" between the metallic lines 13 is formed in units of angstroms (Å) which are substantially smaller than wavelengths of visible rays. As the metallic lines 13 are spaced apart from each other at the intervals "B," which are substantially smaller than wavelengths of visible rays, a polarization component in the first direction in which the metallic lines 13 are arranged is reflected while a polarization component in the second direction, which is substantially perpendicular to the first direction, is transmitted.

Also, in exemplary embodiments, the width of the metallic lines 13 is formed in units of angstroms (Å), and in the current exemplary embodiment, a ratio of the width "A" of the metallic lines 13 and the interval "B" between metallic lines includes a value not less than about 1:1/10 but not larger than about 1:10.

Figure 6:
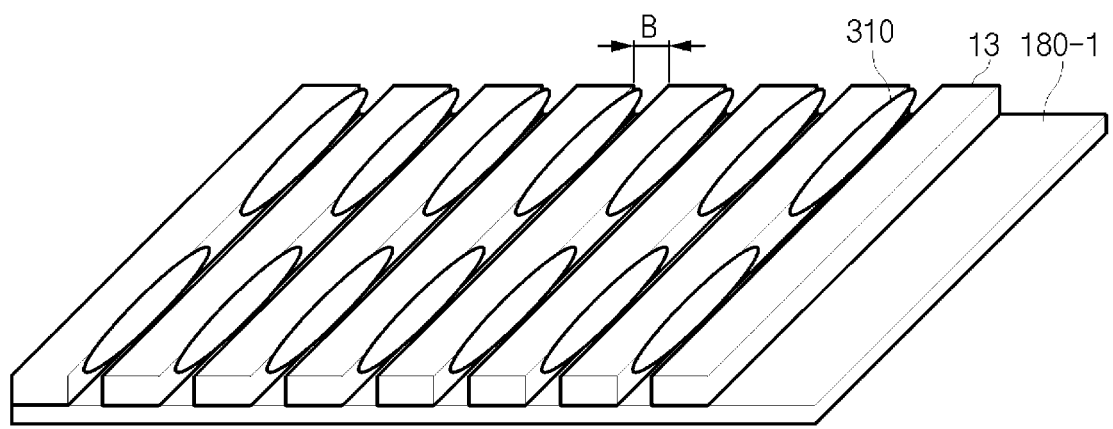
FIG. 6 is a front perspective view illustrating liquid crystals aligned along metallic lines according to one exemplary embodiment of the present invention.

Due to the intervals "B" between the metallic lines 13, liquid crystal molecules 310 positioned on the upper portion of the metallic lines 13 are arranged such that their longitudinal axes are oriented along the first direction (refer to FIG. 6). As a result, the liquid crystal molecules 310 are arranged along the first direction, in which the metallic lines 13 extend, by using the metallic lines 13 without forming an alignment layer and also without performing a rubbing process. In exemplary embodiments, the liquid crystal molecules 310 are arranged along the first direction, in which the metallic lines 13 extend, using only the metallic lines 13.

In the current exemplary embodiment, the first direction corresponds to the direction of the gate lines 121. However, without being limited thereto, the first direction may correspond to the direction of the data lines 171, or may include a certain angle with respect to the gate lines 121 or the data lines 171.

The common electrode panel 200 will now be described with reference to FIGS. 2 to 4.

A light blocking member 220 is formed on an insulation substrate 210 made of transparent glass or plastic, in an exemplary embodiment. The light blocking member 220, also called a black matrix, prevents light leakage. The light blocking member 220 faces the pixel electrode 191 and includes a portion corresponding to the gate line 121 and the data line 171 and a portion corresponding to the TFT in order to prevent light leakage between pixel electrodes 191.

A plurality of color filters 230 is also formed on the insulation substrate 210. The color filters 230 are disposed substantially within regions surrounded by the light blocking members 220, and may extend in a vertical direction along a column of the pixel electrodes 191, in exemplary embodiments. In further exemplary embodiments, each color filter 230 may represent one of the primary colors of red, green and blue. However, primary colors of the present invention are not limited thereto.

An overcoat 250 is formed on the color filter 230 and the light blocking member 220. In exemplary embodiments, the overcoat 250 may be made of an (organic) insulator, prevent exposure of the color filter 230 and provide a planarized surface. In alternative exemplary embodiments, the overcoat 250 may be omitted.

The common electrode 270 is formed on the overcoat 250. In exemplary embodiments, the common electrode 270 is made of a transparent conductor such as ITO or IZO. However, the common electrode 270 of the present invention is not limited thereto.

An alignment layer 21 is coated on an inner surface of the common electrode panel 200. In exemplary embodiments, the alignment layer 21 may cause the liquid crystal molecules 310 to be arranged along the first direction, in which the metallic lines 13 extend, or in the second direction, which is substantially perpendicular to the first direction. In further exemplary embodiments, the liquid crystal molecules 310 may be arranged in various other directions according to characteristics of the liquid crystal molecules 310. A polarizer 22 is provided on an outer surface of the common electrode panel 200. Although the polarizer 22 is not formed on the TFT array panel 100, the metallic lines 13 are considered to serve as the polarizer 22, since the metallic lines 13 allow only light in the direction perpendicular to the first direction to be transmitted therethrough. In the current exemplary embodiment, the polarizer 22 includes a transmissive axis along the second direction, which is substantially perpendicular to the first direction.

The liquid crystal layer 3 has positive dielectric anisotropy, and the liquid crystal molecules 310 within the liquid crystal layer 3 are aligned such that their longitudinal axes are substantially horizontal with respect to the opposing surfaces of the TFT array panel 100 and the common electrode panel 200, in a state in which there is no electric field. In particular, the liquid crystal molecules 310 contacting the TFT array panel 100 are arranged such that their longitudinal axes extend along the first direction, in which the metallic lines 13 extend.

The characteristics of the LCD according to the exemplary embodiment of the present invention will now be described in further detail.

Figure 7:
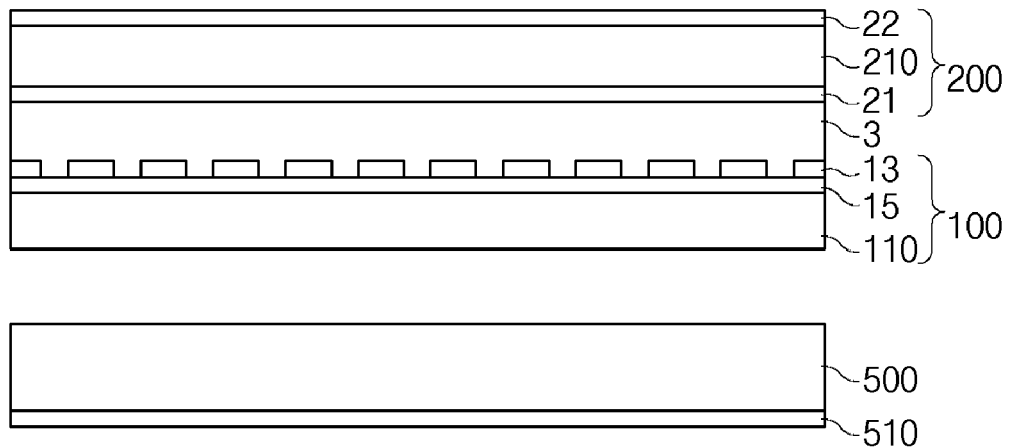
FIG. 7 is a cross-sectional schematic diagram view of the exemplary embodiment of an LCD according to one exemplary embodiment of the present invention.
Figure 8:
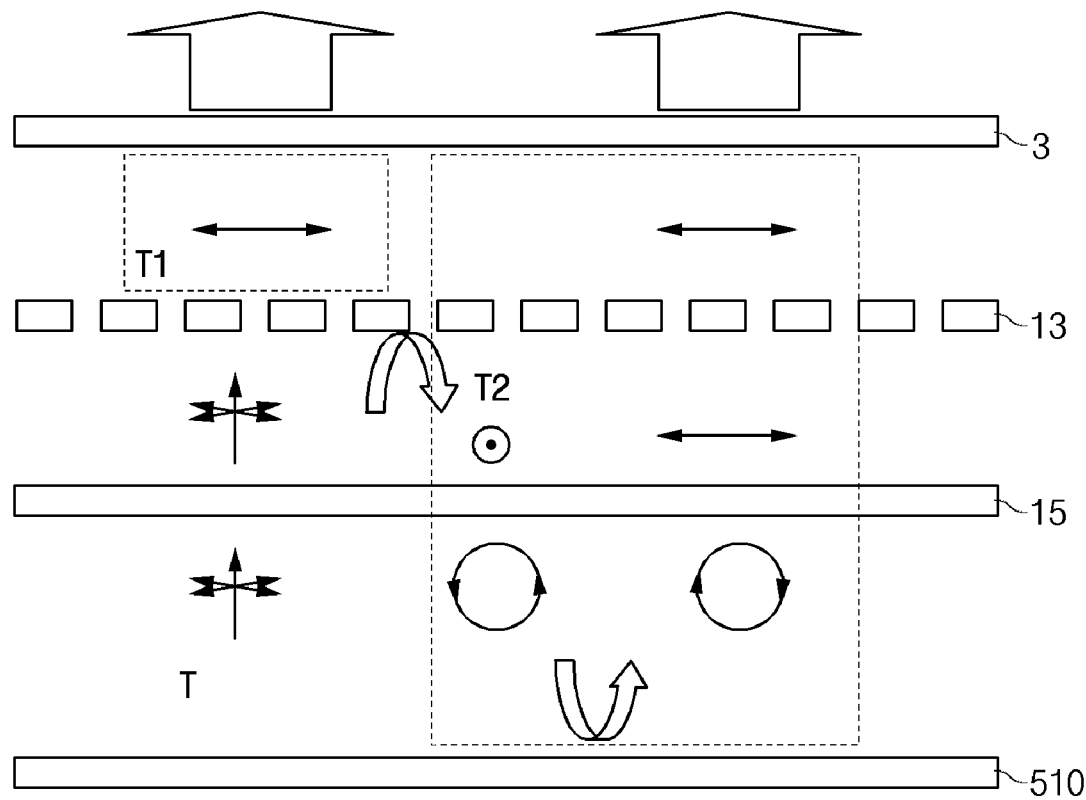
FIG. 8 is a drawing illustrating polarization of light in the exemplary embodiment of an LCD according to one exemplary embodiment of the present invention.

FIG. 6 is a front perspective view illustrating liquid crystal molecules 310 aligned along metallic lines 13 according to one exemplary embodiment of the present invention, FIG. 7 is a cross-sectional schematic diagram view of the exemplary LCD according to one exemplary embodiment of the present invention and FIG. 8 is a drawing illustrating polarization of light in the LCD according to one exemplary embodiment of the present invention.

First, FIG. 6 illustrates an arrangement of the liquid crystal molecules 310 by the metallic lines 13. In FIG. 6, a lower structure of the metallic lines 13 is omitted. The metallic lines 13 extend along the first direction and are arranged at uniform intervals "B" which are substantially parallel to each other. Grooves are formed between the metallic lines 13. The liquid crystal molecules 310 are arranged with their longitudinal axes directed along the grooves.

The intervals "B" are large enough to allow at least a portion of the liquid crystal molecule 310 to be inserted into the grooves, and the grooves are smaller than a length of the longitudinal axes of the liquid crystal molecules 310, in an exemplary embodiment.

A size of the liquid crystal molecules 310, the intervals "B" and the width "A" of the metallic lines may be variably adjusted according to exemplary embodiments of the present invention. In the current exemplary embodiment, the liquid crystal molecules 310 are arranged along the first direction, in which the metallic lines 13 extend, and only light perpendicular to the first direction is allowed to transmit therethrough.

FIG. 7 is a cross-sectional schematic diagram view of the exemplary LCD according to one exemplary embodiment of the present invention.

FIG. 7 shows a backlight unit 500 and a reflector 510 formed on a lower portion of the backlight unit 500 in the exemplary embodiment of an LCD.

The TFT array panel 100 is formed on an upper side of the backlight unit 500. The phase retardation layer 15 is formed on the insulation substrate 110 of the TFT array panel 100. As stated above with reference to FIGS. 1 to 5, thin films such as the gate lines 121 and the pixel electrodes 191 are formed on the phase retardation layer 15. The metallic lines 13 extend along the first direction on the phase retardation layer 15 and are formed substantially parallel with each other, at uniform intervals. The metallic lines 13 function as both the polarizer 22 and the alignment layer of the TFT array panel 100. The liquid crystal layer 3 is directly formed on the metallic lines 13, and liquid crystal molecules 310 are arranged according to the arrangement of the metallic lines 13. The common electrode panel 200 is formed on the liquid crystal layer 3. The insulation substrate 210, the polarizer 22 and the alignment layer 21 of the common electrode panel 200 are shown in FIG. 7. In alternative exemplary embodiments, the common electrode panel 200 includes the polarizer 22 and the alignment layer 21. The phase retardation layer 15 has a slower axis and a faster axis, and is a quarter-wave ($\lambda/4$) plate which makes a phase difference between light in the direction of the slower axis and light in the direction of the faster axis of $\lambda/4$, to thus change circular polarization to linear polarization or linear polarization to circular polarization. The slower axis or the faster axis of the phase retardation layer 15 makes an angle of about 45° with respect to the first direction of the metallic lines 13. In exemplary embodiments, the slower axis or the faster axis of the phase retardation layer 15 makes an angle of about 45° with respect to the second direction.

FIG. 8 illustrates a light path and polarization direction in the TFT array panel 100, the core of the LCD being fabricated as shown in FIG. 7.

Light provided from the backlight unit 500 includes components of every polarization direction. Thus, although the light transmits through the phase retardation layer 15 of the TFT array panel 100, the light still includes the components of every polarization direction. In this respect, however, when the light meets the layer on which the metallic lines 13 extend substantially parallel in the first direction, only the light in the second direction (‥), which is perpendicular to the first direction, transmits therethrough, while the light in the first direction (⊙) is reflected. As the reflected light in the first direction (⊙) passes through the phase retardation layer 15, it is left-circularly polarized, and when the light is reflected from the reflector 510 of the backlight unit 500, it is right-circularly polarized. As the light of the right-hand circular polarization passes through the phase retardation layer 15 again, the light is changed to light in the second direction (‥), which is then allowed to transmit through the metallic lines 13 in order to be used for image display.

Behavior of light after passing through the metallic lines 13 and then being made incident on the liquid crystal layer 3 is the same or substantially similar as that for image display of the LCD, so its description will therefore be omitted.

In this manner, the light component, which is otherwise absorbed by the polarizer 22 rather than being used, may be used for an image display by using the metallic lines 13 and the phase retardation layer 15, such that the luminance of the LCD can be improved.

In addition, because the metallic lines 13 may also serve as the alignment layer, the process of forming and rubbing the alignment layer may be omitted, such that a production cost and a processing time of the LCD can be reduced.

Another exemplary embodiment of the present invention will now be described.

Figure 9:
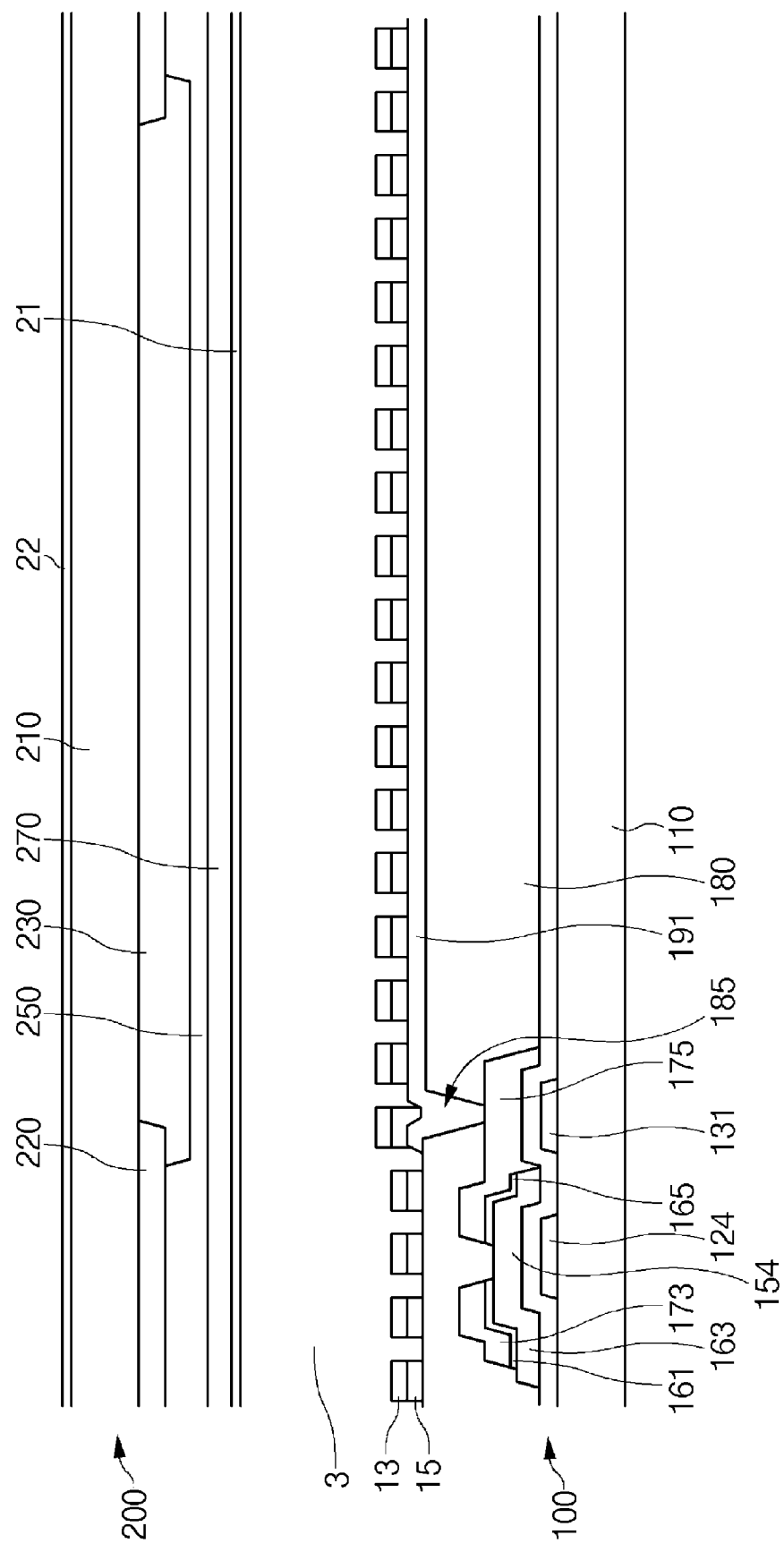
FIGS. 9 to 11 are cross-sectional schematic diagram views of an exemplary embodiment of an LCD according to another exemplary embodiment of the present invention.
Figure 10:
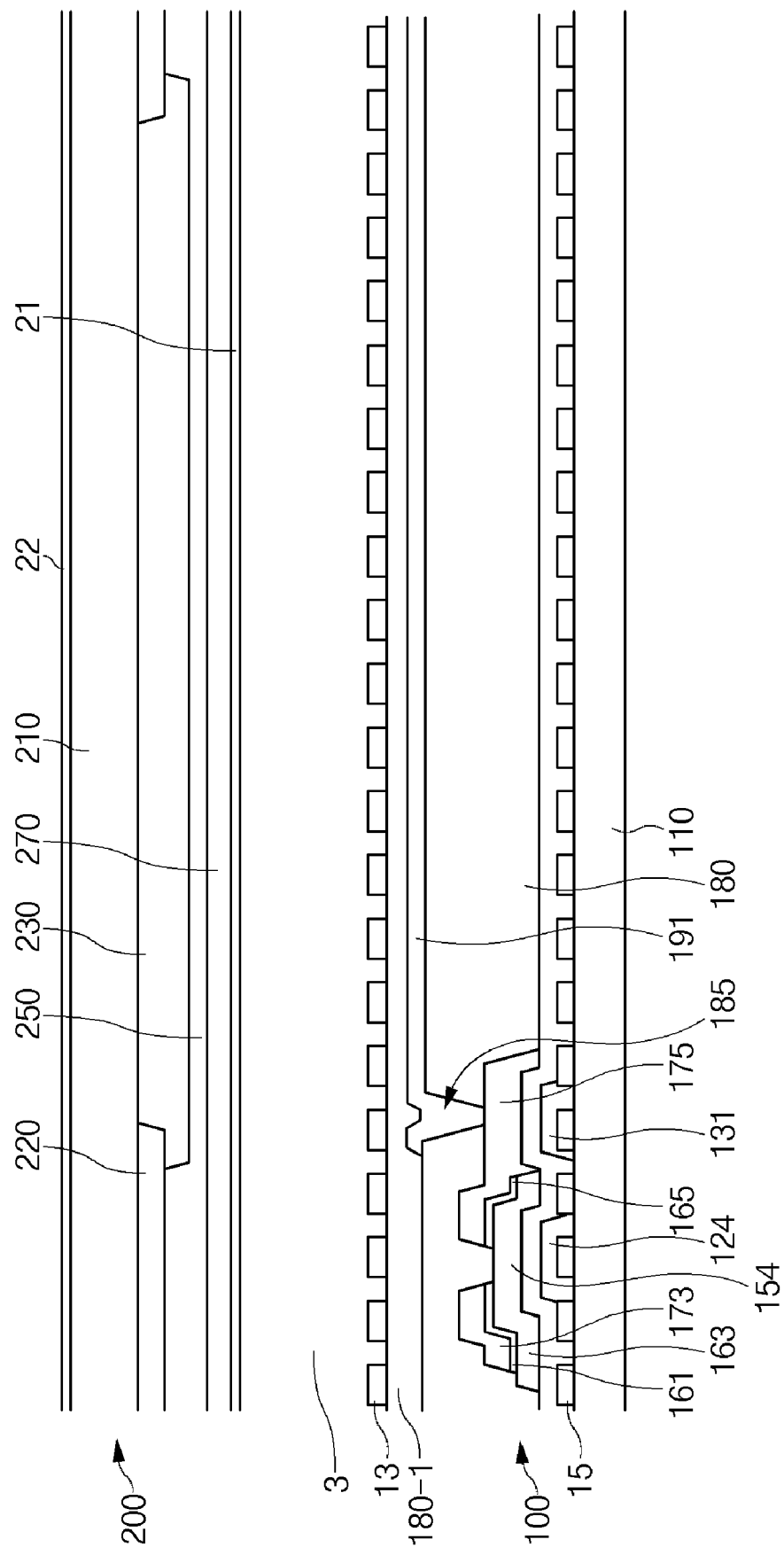
Figure 11:
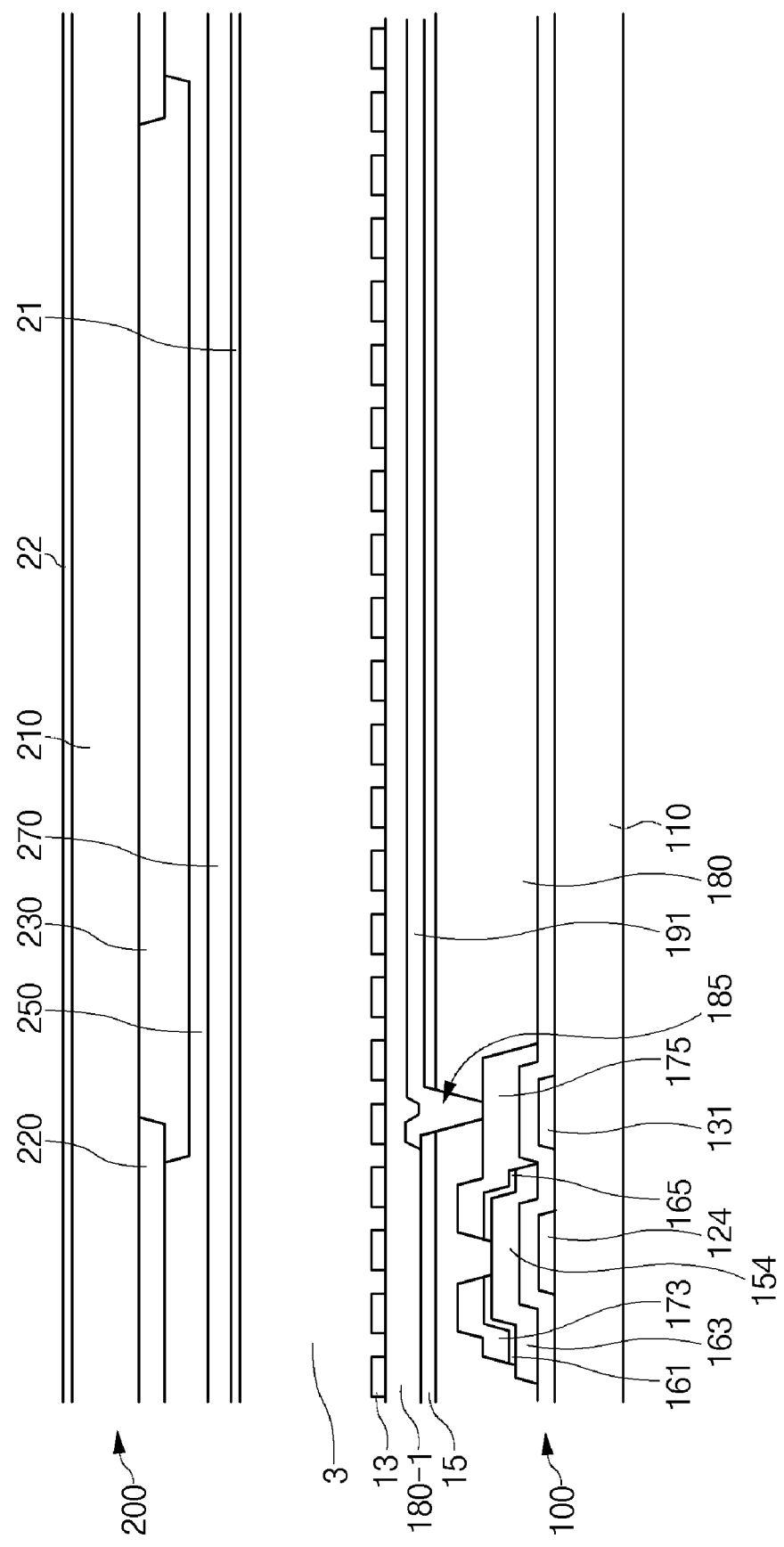

FIGS. 9 to 11 are cross-sectional schematic diagram views of an exemplary embodiment of an LCD according to another exemplary embodiment of the present invention.

Referring back to the LCD in the former exemplary embodiments as shown in FIGS. 1 to 5, the phase retardation layer 15 is formed directly on the insulation substrate 110 and evenly distributed on an entire region of the insulation substrate 110. In addition, the metallic lines 13 are formed on the upper portion of the second passivation layer 180-1, which is formed on the pixel electrodes 191.

Unlike the LCD according to the former exemplary embodiment of the present invention as shown in FIGS. 1 to 5, in the current exemplary embodiment, the phase retardation layer 15 is formed on the pixel electrodes 191 without a second passivation layer 180-1, as shown in FIG. 9. The metallic lines 13 are formed on the phase retardation layer 15. The phase retardation layer 15 and the metallic lines 13 are formed with a same width and at same intervals, and overlap with each other. The phase retardation layer 15 serves not only to change linear polarization to circular polarization or circular polarization to linear polarization, but also prevents the metallic lines 13 and the pixel electrodes 191 from being electrically connected. In exemplary embodiments, the phase retardation layer 15 and the metallic lines 13 are etched in the same process using a single mask.

As shown in FIG. 10, the phase retardation layer 15 and the metallic lines 13 are patterned with the same width and at the same intervals, unlike those in the former exemplary embodiment shown in FIGS. 1 to 5. In an exemplary embodiment, the phase retardation layer 15 is formed on the insulation substrate 110, and may be patterned using the mask which etches the metallic lines 13, without modification. In the current exemplary embodiment, the phase retardation layer 15 and the metallic lines 13 include the same width and intervals and completely overlap with each other, but are not limited thereto. That is, in exemplary embodiments, the phase retardation layer 15 and the metallic lines 13 may partially overlap with each other or may not overlap with each other. As shown in FIGS. 1 to 5, the metallic lines 13 are formed on the second passivation layer 180-1, which is formed on the pixel electrodes 191.

Unlike the exemplary embodiment as shown in FIGS. 1 to 5, with reference to FIG. 11, the phase retardation layer 15 is formed on an upper portion of the passivation layer 180 and on a lower portion of the pixel electrodes 191. A contact hole 185, which connects the pixel electrode 191 and the drain electrode 175, is formed on a portion of the phase retardation layer 15. Since the drain electrode 175 covers the portion on which the contact hole 185 is disposed, there is no problem even if the phase retardation layer 15 does not exist. The second passivation layer 180-1 and the metallic lines 13 are formed on the upper portion of the pixel electrode 191 as in the exemplary embodiment shown in FIGS. 1 to 5.

In this manner, in exemplary embodiments of the present invention, the position of the phase retardation layer 15 may be variably changed. That is, the position of the phase retardation layer 15 may vary in addition to those corresponding elements as presented in the exemplary embodiments of the present invention. However, in exemplary embodiments, the phase retardation layer 15 should be formed on a lower portion of the metallic lines 13. In addition, the phase retardation layer 15 may extend in the first direction and in parallel with the metallic lines 13.

As described above, because the light, which is otherwise absorbed by the polarizer without being used, can be used for image display by using the multiple metallic lines having the intervals narrower than the wavelength of the visible rays and the phase retardation layer, the luminance of the LCD can be enhanced. In addition, because the liquid crystal molecules are arranged along the direction in which the metallic lines are arranged, an alignment layer and a rubbing process thereof are not required, such that the production cost and processing time of the LCD can be reduced.

While this invention has been described in connection with what is presently considered to be some practical exemplary embodiments, it is to be understood that the present invention is not limited to the disclosed exemplary embodiments, but, on the contrary, is intended to cover various modifications and equivalent arrangements included within the spirit and scope of the appended claims.

What is claimed is:

1. A liquid crystal display device comprising:
   an upper panel comprising an inner surface and an outer surface;
   an alignment layer, the alignment layer attached on the inner surface of the upper panel and a polarizer attached on the outer surface of the upper panel;
   a lower panel including a first surface and a second surface disposed opposite to the first surface, the first surface facing the inner surface of the upper panel;
   a plurality of metallic lines disposed on the first surface of the lower panel, the plurality of metallic lines disposed substantially parallel to each other and wherein the plurality of metallic lines extend in a first direction;
   a phase retardation layer disposed on the first surface of the lower panel;
   liquid crystal molecules injected between the upper panel and lower panel; and
   a backlight unit comprising a light source which emits light toward the lower panel and a reflector which reflects light reflected from the lower panel,
   wherein the phase retardation layer is disposed between the plurality of metallic lines and the lower panel, and
   wherein intervals between the plurality of metallic lines are narrower than wavelengths of visible rays.

2. The device of claim 1, wherein the plurality of metallic lines reflect light with a polarization component in the first direction and allow light with a polarization component in a second direction to transmit therethrough, the second direction substantially perpendicular to the first direction.

3. The device of claim 1, wherein the plurality of metallic lines contact the liquid crystal molecules to align the liquid crystal molecules in the first direction.

4. The device of claim 1, wherein the polarizer allows light with a polarization component in the first direction to transmit therethrough.

5. The device of claim 1, wherein the phase retardation layer includes a slower axis and a faster axis, and changes circular polarization to linear polarization or linear polarization to circular polarization by creating a phase difference between light in the slower axis direction and light in the faster axis direction of one quarter wavelength.

6. The device of claim 5, wherein the slower axis or the faster axis of the phase retardation layer makes an angle of about 45 degrees with respect to the first direction or a second direction substantially perpendicular to the first direction.

7. A liquid crystal display device, comprising:

an upper panel comprising an inner surface and an outer surface;

an alignment layer attached on the inner surface of the upper panel;

a polarizer attached on the outer surface of the upper panel;

a lower panel including a first surface and a second surface disposed opposite to the first surface, the first surface facing the inner surface of the upper panel;

a plurality of metallic lines disposed on the first surface of the lower panel, the plurality of metallic lines disposed substantially parallel to each other and which extend in a first direction;

liquid crystal molecules injected between the upper and lower panels; and a backlight unit comprising a light source which emits light toward the lower panel and a reflector which reflects light made incident from the lower panel, wherein the lower panel comprises a thin film transistor, a pixel electrode, a phase retardation layer and an insulation substrate, and the phase retardation layer is disposed on the insulation substrate, the thin film transistor is disposed on the phase retardation layer, the pixel electrode is disposed on the thin film transistor and the plurality of metallic lines are disposed on the pixel electrode, and wherein intervals between the plurality of metallic lines are narrower than wavelengths of visible rays.

* * * * *